United States Patent
Serrecchia

(10) Patent No.: US 11,852,095 B2
(45) Date of Patent: Dec. 26, 2023

(54) METHOD FOR DIVIDING A FUEL INJECTION

(71) Applicant: Vitesco Technologies GmbH, Regensburg (DE)

(72) Inventor: Philippe Serrecchia, Toulouse (FR)

(73) Assignee: Vitesco Technologies GmbH, Regensburg (DE)

(*) Notice: Subject to any disclaimer, the term of this patent is extended or adjusted under 35 U.S.C. 154(b) by 0 days.

(21) Appl. No.: 17/787,723

(22) PCT Filed: Feb. 2, 2021

(86) PCT No.: PCT/EP2021/052403
§ 371 (c)(1),
(2) Date: Jun. 21, 2022

(87) PCT Pub. No.: WO2021/156237
PCT Pub. Date: Aug. 12, 2021

(65) Prior Publication Data
US 2023/0024694 A1    Jan. 26, 2023

(30) Foreign Application Priority Data
Feb. 5, 2020   (FR) ..................................... 2001118

(51) Int. Cl.
*F02D 41/40*    (2006.01)
(52) U.S. Cl.
CPC .... *F02D 41/402* (2013.01); *F02D 2200/0614* (2013.01)
(58) Field of Classification Search
CPC . F02D 41/40; F02D 41/402; F02D 2200/0614
(Continued)

(56) References Cited

U.S. PATENT DOCUMENTS 9,903,307 B2 * 2/2018 Polonowski .......... F02D 41/068
10,329,997 B2 * 6/2019 Kurtz .................... F02D 41/403
(Continued)

FOREIGN PATENT DOCUMENTS

FR     3030632 A1    6/2016
JP     2002161790 A   6/2002
JP     2013217379 A  10/2013

OTHER PUBLICATIONS

International Search Report and Written Opinion for International Application No. PCT/EP2021/052403, dated May 4, 2021, with partial English translation, 10 pages.
(Continued)

*Primary Examiner* — John Kwon
*Assistant Examiner* — Johnny H Hoang
(74) *Attorney, Agent, or Firm* — RatnerPrestia

(57) ABSTRACT

A method, for a direct injection engine, for dividing a fuel injection corresponding to an engine cycle into minimum sub-injections, including: determination of a desired maximum number of sub-injections by dividing a mass of fuel to be injected during the engine cycle by a minimum injectable mass and rounding down to the nearest integer; lower bounding of the desired maximum number by an authorized maximum number of sub-injections; verification that an injection duration, for such a desired maximum number of sub-injections, is less than a duration of a possible injection window and decrementation of the desired maximum number, otherwise iteration until a positive verification.

6 Claims, 1 Drawing Sheet

(58) Field of Classification Search
USPC ........................... 701/101–105; 123/299–305
See application file for complete search history.

(56) References Cited

U.S. PATENT DOCUMENTS

| | | |
|---|---|---|
| 10,711,729 B2 * | 7/2020 | Kurtz .................... F02D 41/405 |
| 2009/0177364 A1 | 7/2009 | Hattori |
| 2017/0191442 A1 | 7/2017 | Polonowski et al. |
| 2018/0080358 A1 | 3/2018 | Ulstad et al. |

OTHER PUBLICATIONS

International Search Report and Written Opinion for International Application No. PCT/EP2021/052403, dated May 4, 2021, 14 pages.

* cited by examiner

METHOD FOR DIVIDING A FUEL INJECTION

CROSS REFERENCE TO RELATED APPLICATIONS

This application is the U.S. National Phase Application of PCT International Application No. PCT/EP2021/052403, filed Feb. 2, 2021, which claims priority to French Patent Application No. 2001118, filed Feb. 5, 2020, the contents of such applications being incorporated by reference herein.

FIELD OF THE INVENTION

The invention relates to the field of engine control, and more particularly in the case of a gasoline engine with direct injection.

BACKGROUND OF THE INVENTION

It is known to inject the fuel, in an internal combustion engine, directly into the cylinder. This can for example be achieved by means of a chamber (or rail) containing pressurized fuel and an injector selectively closing off a pipe connecting said chamber to the cylinder. When the injector is open, the fuel is sprayed into the cylinder in order to create an aerosol capable of mixing, as uniformly as possible, with the air present in the cylinder.

The problem that arises is that the sprayed fuel can reach the opposite wall of the cylinder. This is detrimental in that the fuel then deposits on the wall and then tends to remain liquid, mainly when the engine is cold. The fuel then has an increased difficulty in evaporating, negatively impacting its subsequent combustion. Such a deposit thus disturbs the smooth implementation of a uniform mixture with the air and leads to detrimental consequences in terms of performance and/or pollution.

SUMMARY OF THE INVENTION

The risk of parietal deposition, which it is wished to avoid, increases with the duration of a continuous injection. Thus, in order to solve this problem, an aspect of the invention proposes to divide an injection generally carried out in a single continuous spraying/opening of the injector into a plurality of sub-injections of shorter individual durations.

For this, an aspect of the invention is a method, for a direct injection engine, for dividing a fuel injection corresponding to an engine cycle into minimum sub-injections, comprising the following steps:

determination of a desired maximum number of sub-injections by dividing a mass of fuel to be injected during the engine cycle by a minimum injectable mass and rounding down to the nearest integer, lower bounding of said desired maximum number by an authorized maximum number of sub-injections, verification that an injection duration, for such a desired maximum number of sub-injections, is less than a duration of a possible injection window and decrementation of the desired maximum number, otherwise iteration until a positive verification.

Particular features or embodiments, which may be used alone or in combination, are:

the lower bounding is carried out according to the formula $N:=\text{Min}(N, N_{max})$, with Min the minimum function, N the desired maximum number of sub-injections and $N_{max}$ the authorized maximum number of sub-injections, the injection duration is calculated according to the formula $D=N*d(N-1)*S$, with D the injection duration, N the desired maximum number of sub-injections, d a duration of one sub-injection and S a minimum hydraulic separation duration to be observed between two sub-injections, the duration of a sub-injection is calculated according to the formula $d=M/(N*Q)$, with d the duration of one sub-injection, M the mass of fuel to be injected during the engine cycle, N the desired maximum number of sub-injections and Q a dynamic flow rate of the injector, the determined sequence of sub-injections is applied by starting the first sub-injection at an optimum start of injection time, the method is more particularly applied when the engine is cold.

BRIEF DESCRIPTION OF THE DRAWINGS

An aspect of the invention will be better understood from reading the following description, given solely by way of example, and with reference to the appended drawings, in which.

DESCRIPTION OF THE EMBODIMENTS

Figure 1:
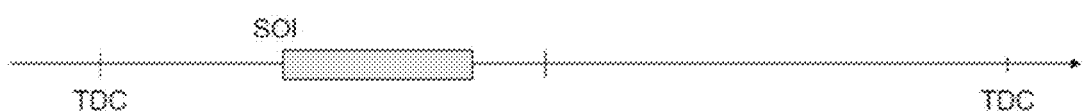
FIG. 1 shows a first injection timing diagram according to the prior art.

With reference to FIG. 1, a fuel injection is carried out in a cylinder of an internal combustion engine, at each cycle, i.e. once every two revolutions of the crankshaft, between two top dead centers TDC, and injects a mass M of fuel.

Such an injection is carried out in a possible injection window beginning at a start of injection SOI time and ending, at the latest, at an end of injection EOI time. The duration Dmax of this injection window is therefore equal to EOI—SOL In a known manner, a positioning or an extent is conventionally identified, in the combustion cycle, relative to a top dead center TDC. Two top dead centers are separated by an angle of 720° CRK. A positioning, respectively an extent, can be identified, in the combustion cycle, by an angle, respectively by an angular extent. Alternatively and equivalently, a positioning, respectively an extent, can be identified, in the combustion cycle, by a time, respectively by a temporal extent or duration. The equivalence here is bijective and requires knowledge of the engine speed RM, which gives an angle/time conversion factor.

All the parameters of the injection SOL EOI, Dmax and M are determined, at each cycle, by the engine control, according to any method whatsoever, outside the scope of an aspect of the invention.

Figure 2:
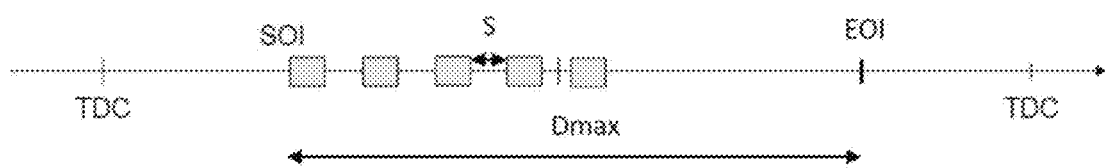
FIG. 2 shows a second injection timing diagram according to an aspect of the invention.

The aspect of the invention is to reduce the continuous injection time, i.e. the time during which an injector is open. For this, the method of an aspect of the invention proposes dividing a long injection into several sub-injections, as illustrated in FIG. 2.

This division must respect certain assumptions and comply with certain constraints.

A mandatory assumption is that the quantity/mass of fuel injected M during a cycle remains the same. Thus, the sum of the elementary masses of all the sub-injections carried out during a cycle must be equal to M.

A constraint linked to the control of an injector, and to the electrical consumption and/or to the heating of the control means is that the desired maximum number of sub-injections per cycle is limited by an authorized maximum number Nmax. This authorized maximum number Nmax is considered constant or is determined by the command and control according to the engine speed and the battery voltage.

A constraint, linked to the principle of operation of an injector, is that there is a minimum "rest" duration or minimum hydraulic separation duration S to be observed between two sub-injections, during which the injector must remain closed. Moreover, because of its all or nothing control, an injector has a mass resolution or minimum injectable mass Mmin, below which it is not possible to go. This minimum mass Mmin is a function of the fuel pressure in the rail and is known to the engine control which is able to determine it at any time.

A final constraint, linked to the engine cycle, is that all of the injection, or all of the sub-injections, should be carried out during the injection window, that is to say between SOI and EOI.

Thus, an aspect of the invention proposes to replace a long injection with a plurality of sub-injections, respecting the constraints stated above.

For this, the method begins by determining a desired maximum number N of sub-injections. It has been seen that the problem of parietal deposition can be improved by means of the shortest possible sub-injections. For a sub-injection to be as short as possible, the desired maximum number N of sub-injections should be as large as possible.

In order to simplify the calculations, a simplifying assumption, which is optimal but not obligatory, of iso mass distribution between the sub-injections is made. Thus, all the sub-injections of a cycle inject the same mass/quantity M/N of fuel. That is to say, assuming a constant dynamic flow rate Q taking into account the short durations over a cycle, all the sub-injections of a cycle are carried out according to an identical duration d.

Thus, according to one feature, the desired maximum number N of sub-injections is determined, initially, by dividing the mass M of fuel to be injected during the engine cycle by the minimum injectable mass Mmin. Since the desired maximum number N of sub-injections is necessarily an integer, the ratio M/Mmin is rounded down to the nearest integer. Thus, N=rounded (M/Mmin). This approach makes it possible to integrate the constraint linked to the minimum injectable mass.

This desired maximum number N is then compared and if necessary reduced to the authorized maximum number Nmax of sub-injections. A lower bounding is thus carried out. This is for example achieved by assigning to N the value corresponding to the minimum between the desired maximum number N previously determined and the authorized maximum number Nmax. This makes it possible to integrate the constraint linked to the authorized maximum number Nmax of sub-injections.

It is also necessary to verify that the constraint of the maximum injection duration is observed. For this, the injection duration D is calculated as a function of the desired maximum number N of sub-injections previously determined and compared with the duration Dmax of the injection window.

If, and as soon as a verification that the injection duration D is less than the duration Dmax of the injection window is obtained, the desired maximum number N of sub-injections previously determined is validated.

An injection based on N sub-injections can be performed.

Conversely, if the calculated injection duration D is greater than the duration Dmax of the injection window, the desired maximum number of sub-injections N is reduced by decrementation, for example by a decrement of one unit. The injection duration D is recalculated on the basis of the new desired maximum number N of sub-injections. N having been decremented, the injection duration D must also be reduced. A new verification that the injection duration D is less than the duration Dmax of the injection window is carried out. If this verification is positive, D being less than Dmax, the last obtained desired maximum number N of sub-injections is retained. Otherwise, the iteration is continued: decrementation and new verification, until a positive verification is obtained.

It may be noted that this iterative process is necessarily convergent towards an acceptable and functional solution. Specifically, the case where N=1, corresponding to the injection parameters determined by the engine control, is possible, at a minimum.

It is possible to verify the first constraint N<Nmax, then the second constraint, linked to the extent Dmax of the injection window. Alternatively, it is possible to verify the second constraint, by reducing N until presenting an extent D of the sequence of sub-injections contained in the extent Dmax of the injection window, then to apply if necessary the second constraint by bounding N by Nmax.

In order to detail a possible embodiment, the lower bounding is carried out according to the formula N:=Min(N, Nmax), with N the desired maximum number of sub-injections and Nmax the authorized maximum number of sub-injections. Thus, the desired maximum number N retained is the number of sub-injections obtained previously or is replaced by the authorized maximum number of injections Nmax if the latter is smaller.

As illustrated in FIG. 2, an injection is divided into N sub-injections. Each sub-injection requires a duration d. Between each two successive sub-injections, it is necessary to observe a minimum duration or minimum hydraulic separation duration S, characteristic of the injector, which is a function of the fuel pressure in the rail and therefore known. Thus, according to one feature, the duration D of a split injection sequence comprising N successively sequenced sub-injections, according to a minimum duration, can be calculated according to the formula $D=N*d+(N-1)*S$, with D the injection duration, N the desired maximum number of sub-injections, d a duration of one sub-injection and S a minimum hydraulic separation time to be observed between two sub-injections.

According to one feature, this formula is temporal, with d, D, S and Dmax expressed in seconds (or ms). Alternatively, in an equivalent manner, this formula can be angular, d, D, S and Dmax expressed in °CRK.

In absolute terms, the dynamic flow rate Q of the injector depends on the diameter of the injector, which is constant, and on the fuel pressure in the rail, which is known to the engine control. The dynamic flow rate Q is assumed to be known or determinable by the engine control. It is assumed that the dynamic flow rate Q of an injector is constant during a cycle or at least during an injection. Thus, the duration d of a sub-injection is proportional to the mass M/N to be injected during said sub-injection, the proportionality factor being the inverse of the dynamic flow rate $1/Q$. The duration d can be calculated according to the formula $d=M/(N*Q)$, with d the duration of one sub-injection, M the mass of fuel to be injected during the engine cycle, N the desired maximum number of sub-injections and Q the dynamic flow rate of the injector.

It is possible, by eliminating d, to simplify the previous formula: $D=M/Q+(N-1)*S$.

Once the desired maximum number N of sub-injections has been determined and validated according to the steps previously described, the sequence of sub-injections thus determined is applied. Said sequence begins the first sub-injection at an optimum start of injection SOI time. This optimum start of injection time is that determined by the command and control, including in the case where a single injection is applied. The sequence is then carried out by performing N sub-injections in sequence, only separated by a minimum hydraulic separation duration S between two sub-injections.

The method or methods previously described are particularly advantageous when the engine is still cold. Thus, the application of such a method is particularly decided in this case.

According to another feature, the method/strategy according to an aspect of the invention is not applied as a priority. Thus, if another injection strategy is applicable with a certain degree, even a low degree, of urgency, this other strategy will prevail, insofar as the two strategies are not compatible.

In order to illustrate the method, a numerical application example will be given, with reference to FIG. 2. It is assumed that the engine speed is 2000 rpm, that the engine control has determined a mass to be injected M of 20 mg for the next cycle, an SOI at 270° CRK before top dead center, TDC, and a maximum injection window width of 120° CRK. It is further assumed that the injectors allow a dynamic flow rate Q of 5 mg/ms, a minimum injectable mass of Mmin=2.5 mg observing a minimum hydraulic separation duration S of 1 ms and that the authorized maximum number of injections Nmax is 5.

A first desired maximum number of injections N is determined by dividing M/Mmin, that is to say 20/2.5, or 8. This result is reduced by Nmax and we obtain N=5. This results in a mass M/N=4 mg per sub-injection and a duration d of $M/(N*Q)$, that is to say d=0.8. The calculation of the duration D of the injection sequence is given by $D=N*d+(N-1)*S$, that is to say $D=5*0.8+4*1=8$ ms. At 2000 rpm, these 8 ms correspond to 96° CRK. It is clearly verified that this extent is less than the extent of the injection window of 120° CRK. Thus, it is possible to perform an injection divided into 5 sub-injections, according to the timing diagram in FIG. 2.

An aspect of the invention has been illustrated and described in detail in the drawings and the description above. This should be considered as illustrative and given by way of example and not as limiting the invention to this description only. Many variant embodiments are possible.

LIST OF REFERENCE SIGNS d: duration of a sub-injection,
D: injection duration,
Dmax: maximum duration of the injection window,
N: desired maximum number of sub-injections,
Nmax: authorized maximum number of sub-injections,
M: mass to be injected over the current cycle,
Mmin: minimum injectable mass,
Q: dynamic flow rate of the injector,
S: minimum hydraulic separation duration to be observed between two sub-injections,
SOI: start of injection.

The invention claimed is:

1. A method, for a direct injection engine, of dividing a fuel injection corresponding to an engine cycle into minimum sub-injections, comprising:
   determining a desired maximum number of sub-injections by (i) dividing a mass of fuel to be injected during the engine cycle by a minimum mass per injection for a fuel injector of the direct injection engine and (ii) rounding down to a nearest integer,
   selecting between the lower of said desired maximum number of sub-injections and a predetermined authorized maximum number of sub-injections as a selected maximum number of sub-injections,
   verifying that an injection duration, for the selected maximum number of sub-injections, is less than a duration of a possible injection window; and
   decrementing the selected maximum number when the injection duration is more than the duration of the possible injection.

2. The method as claimed in claim 1, wherein the selecting is carried out according to a formula $N:=Min(N, Nmax)$, with Min a minimum function, N the desired maximum number of sub-injections and Nmax the predetermined authorized maximum number of sub-injections.

3. The method as claimed in claim 1, wherein the injection duration is calculated according to a formula $D=N*d+(N-1)*S$, with D the injection duration, N the desired maximum number of sub-injections, d a duration of one sub-injection and S a minimum hydraulic separation duration to be observed between two sub-injections.

4. The method as claimed in claim 3, wherein the duration of a sub-injection is calculated according to the formula $d=M/(N*Q)$, with d the duration of one sub-injection, M the mass of fuel to be injected during the engine cycle, N the desired maximum number of sub-injections and Q a dynamic flow rate of the injector.

5. The method as claimed in claim 1, wherein a determined sequence of sub-injections is applied by starting the first sub-injection at an optimum start of injection time.

6. The method as claimed in claim 1, applied when the engine is cold.

* * * * *